Patented Jan. 14, 1936

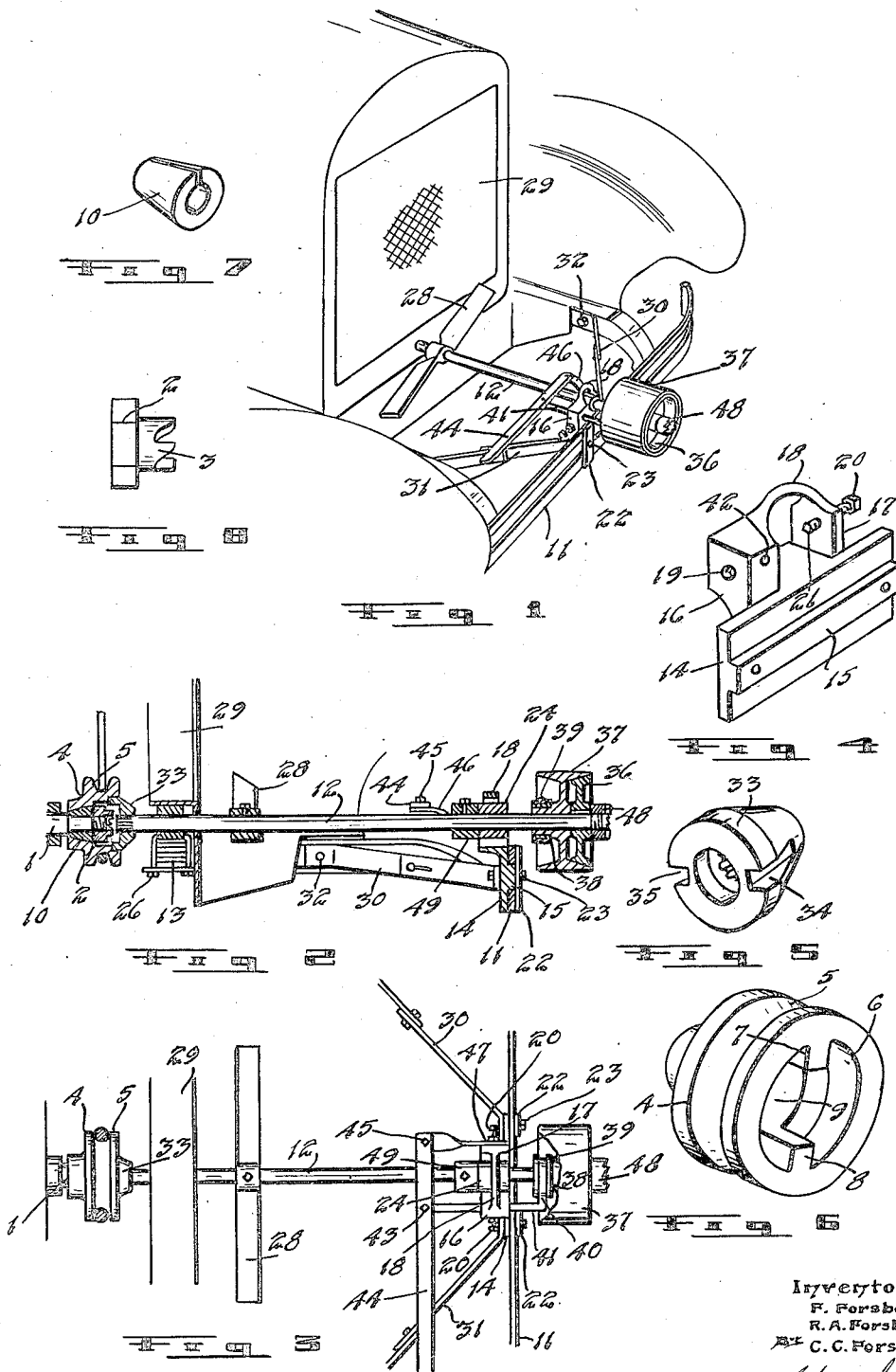

2,027,638

UNITED STATES PATENT OFFICE 2,027,638

POWER TAKE-OFF

Fredrick Forsberg, Robert A. Forsberg, and Casper C. Forsberg, Rural Municipality of Dauphin, Manitoba, Canada Application October 7, 1932, Serial No. 636,668

3 Claims. (Cl. 287—108)

The invention relates to improvements in power take-offs and an object of the invention is to provide a power take-off which can be easily and quickly installed on an existing truck or passenger car and without requiring any material changes to be made in the existing car structure and further to provide the device with a belt pulley at the forward end which can be readily shifted by an attendant to a driving or a non-driving position.

A further object is to provide a construction which allows the driving shaft to be easily and accurately aligned with the crank shaft of the engine and also an arrangement which permits of the effective and easy coupling of the rear end of the driving shaft to the front end of the crank shaft.

A still further object of the invention is to provide a construction which utilizes the front bumper of the car for carrying the bearing employed and also provides adjustable, angularly disposed brace bars for preventing lateral shifting of such bearing.

A still further object is to provide a fan on the driving shaft for cooling the customary radiator.

With the above objects in view, the invention consists essentially in the arrangement and construction of parts hereinafter more particularly described, reference being had to the accompanying drawing, in which:—

Fig. 1 is a perspective view of the power take-off as introduced on an automobile.

Fig. 2 is an enlarged detailed vertical sectional view longitudinally and centrally through the take-off.

Fig. 3 is a plan view of the parts appearing in Figure 2.

Fig. 4 is a perspective view of the front bearing support.

Fig. 5 is a perspective view of the coupling.

Fig. 6 is a perspective view of the special fan belt pulley supplied.

Fig. 7 is a perspective view of the friction cone used.

Fig. 8 is a side view of the fan pulley nut.

In the drawing like characters of reference indicate corresponding parts in the several figures.

The power take-off herein described is particularly designed for installation on automobiles and without requiring to materially change the existing automobile structure and when the device has been placed on the automobile, the automobile can be used as a portable power plant, the limit of the power being governed only by the effectiveness of the engine.

In equipping an existing automobile such as a Ford passenger car or truck with our invention, we first remove the existing fan belt pulley from the front end of the engine crank shaft 1, this being done by unscrewing the customary nut 2 located on the forward end of the crank shaft and holding said pulley in place. In passing it is to be noted that this nut is supplied at its front side with clutch teeth 3 of well known design for cranking purposes.

After the existing fan pulley has been removed, we place a special fan pulley 4 which we provide on the front end of the crank shaft, the pulley being provided with an exterior fan belt receiving channel 5 and with an interior front cavity 6 which contains a pair of diametrically opposing lengthwise extending ribs or teeth 7 and 8 integrally cast with the body of the pulley and which has the hub part thereof to the rear of the cavity cone-shaped as indicated at 9.

Having substituted the pulley 4 on the crank shaft for the other pulley mentioned, we then insert a longitudinally split friction cone 10 on the shaft, this cone entering the cone shaped cavity 9 of the hub and this being in place, we then apply the nut 2 on the shaft and tighten it up against the front end of the friction cone.

The nut 2 screw threads onto the shaft and as one screws it back by say a socket wrench, it causes the friction cone with which it engages to effectively secure by the jamming action produced, the special pulley to the shaft and when this is done, it will be noted that one can still crank the car in the usual manner as the nut 2 having the teeth 3 is retained. In this way, it is unnecessary subsequently to remove the special pulley in order to crank the car in a case where the other parts of the power take-off later described have been removed.

The existing car bumper 11 is utilized to support the front bearing for the drive shaft 12 of the power take-off. A plate 14 is supplied which has a longitudinally extending central rib 15 and the plate carries two upstanding spaced opposing lugs 16 and 17 tied together by a top strap 18 and each fitted with aligned screw threaded holes 19 receiving adjusting bolts 20, said bolts both having pointed or cone shaped inner ends 21. The plate 14 is placed centrally to the inner side of the bumper with the rib 15 positioned between the top and lower cross bars of the bumper and similar vertical clamping plates 22 are placed in front of the bumper and are bolted to the plate 14 by fastening bolts 23 provided, these bolts passing through the rib. When the bolts 23 have been tightened up, the plate 14 and associated parts are firmly secured to the bumper and the lugs at such time appear above the upper edge of the bumper.

A bearing 24 is entered between the lugs and is pivotally supported at the sides by the bolts 20 and this bearing rotatably receives the forward end of the shaft 12 which is axially aligned with the crank shaft and in this regard, it will be necessary for one in placing the plate 14 to see that proper alignment is secured.

Directly in advance of the radiator, we locate a fan 28 which is secured to the shaft 12 and operates to cool the radiator 29 by blowing air rearwardly therethrough. Adjustable brace bars 30 and 31 extend between the plate 14 and the front of the chassis, these being bolted to the chassis at 32 and fastened to the plate by the bolts 23 and being adjustable midway of their length as shown to accommodate them to the position of the plate.

The rear end of the shaft 12 is splined and enters a coupling 33 and this coupling is supplied on its outer face with diametrically opposing slots 34 and 35 adapted to slidably receive the ribs or teeth 8 and 9 hereinbefore mentioned, such arrangement insuring of the rotation of the shaft 12 with the crank shaft of the engine. To the front end of the shaft 12, we secure permanently a wheel 36 having a coned face and this is adapted to frictionally engage with the interior coned face of a driving pulley 37 slidably mounted on the shaft for movement towards and away from the wheel 36.

Associated with the hub of the pulley 37 is a flanged sleeve 38 and around the sleeve, we pass a band 39 which is pivotally attached at 40 to the forward end of a shifting rod 41, said rod passing slidably through a hole 42 provided in the lug 16 and having its rear end pivotally attached at 43 to a lever 44. One end of the lever is pivotally fastened by a bolt 45 to a supporting arm 46 which is mounted on one of the bolts 20 and is secured in place by a jam nut 47 screw threaded on the bolt. Obviously when the nut is tightened up towards the lug 17, it will effectively secure the arm 46 in place.

Immediately to the rear of the bearing 24, we locate a collar 49 secured to the shaft 12 and preventing forward end shifting thereof.

When this device is placed on a car, the car becomes a portable power plant as one can apply a driving belt on the pulley 37 and use the engine of the car for driving purposes. When the lever 44 is in its forward position, the pulley is in frictional contact with the wheel 36 so that said pulley is driven by the shaft 12. In the rear position of the lever 44, the pulley is clear of the wheel 36 so that the shaft is free to revolve within the pulley and no power will be transmitted at such time by the device.

The bearings and other parts supplied allow the shaft 12 to be very quickly aligned with the crank shaft and as the various fittings are made so that they can be readily attached to the existing car structure, it is a very easy matter to equip a car with the appliance.

What we claim as our invention is:—

1. The combination with the forward end of the crank shaft of an internal combustion engine and a rotatably mounted driving shaft axially aligned therewith, of a pulley secured to the forward end of the crank shaft and provided with an internal cavity surrounding the crank shaft and with driving ribs within the cavity and a coupling secured to the rear end of the driving shaft and entering the cavity and provided with slots receiving the driving ribs.

2. The combination with the forward end of the crank shaft of an internal combustion engine and a rotatably mounted driving shaft axially aligned therewith, said crank shaft having the forward end thereof exteriorly screw threaded, of a pulley mounted on the forward end of the crank shaft and presenting a forward cavity surrounding the crank shaft and driving ribs within the cavity and having the hub to the rear of the cavity interiorly tapered, a longitudinally split friction cone mounted on the shaft and entering the hub, a jam nut screw threaded on the forward end of the crank shaft and engaging the cone and a coupling secured to the rear end of the driving shaft and entering the cavity of the pulley and provided with slots receiving the driving ribs of the pulley.

3. The combination with the forward end of the crank shaft of an internal combustion engine, of a pulley mounted on the forward end of the crank shaft, said pulley having a forward cavity surrounding the crank shaft and driving ribs extending into the cavity, the hub thereof to the rear of the cavity being interiorly tapered, a longitudinally split friction cone mounted on the shaft and entering the hub and a nut screw threaded on the front end of the shaft and engaging the cone and a coupling receivable into said cavity and engageable with said ribs.

FREDRICK FORSBERG.
ROBERT A. FORSBERG.
CASPER C. FORSBERG.